United States Patent Office 2,743,718
Patented May 1, 1956

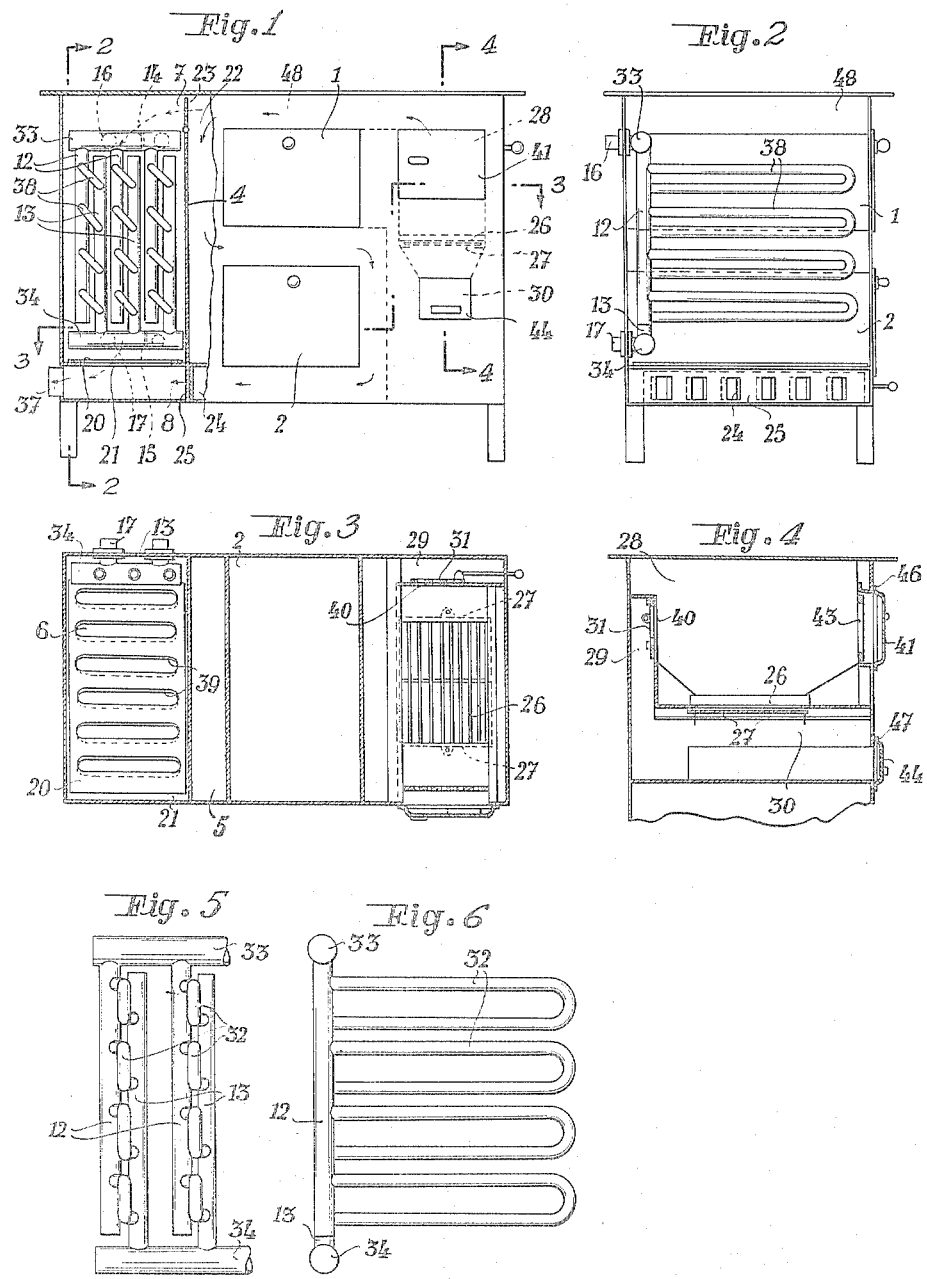

2,743,718

KITCHEN RANGE

Josef Kindig, Kirchberg an der Pielach, Austria

Application September 16, 1952, Serial No. 309,838

Claims priority, application Austria October 10, 1951

2 Claims. (Cl. 126—5)

Kitchen ranges are known, which incorporate a fixture for preparing warm water, hot water, or steam.

In a known embodiment that fixture is arranged close to the flue in a separate heating space, which can be closed. To reach the fixture for preparing warm water, the combustion gases must first sweep the ovens, to which they thus deliver most of their heat, whether or not the ovens are used. Owing to the long and often curved path of the heating gases, an effective and efficient preparation of warm water is not possible.

Moreover, ranges are known in which a fixture for preparing warm water, hot water, or steam is arranged closely beside the combustion space, individual heating tubes extending into the combustion space or surrounding said space directly. In a known plant of this type the combustion space is arranged between the fixture for preparing hot water and the ovens.

The disadvantage of such arrangements resides mainly in the very short service life of the heating tubes directly exposed to the fire, unless they are made of high-grade, expensive material. The scaling of the heating tubes exposed directly to the fire takes place whether or not the fixture for preparing hot water is in service. Moreover, the tube initially filled with cold water interferes with the heating-up of the range.

It is an object of the invention to avoid these disadvantages, to prolong the service life of the heating tubes, and to increase essentially the efficiency of the plant for preparing hot water or steam. This is achieved by the arrangement of the entire plant for preparing hot water or steam in a separate heating space, which can be shut off from the combustion space or the flue or both, the straight-line connection from the combustion space to that heating space being at most once the width of the oven. Thereby it is achieved that the flames sweep effectively at least part of the fixture for preparing hot water or steam.

It is a feature of the invention to provide in a kitchen range comprising a combustion chamber and a flue, the combination of means defining a laterally closed heating chamber which is formed with an open top through which it communicates with the combustion chamber whereas at the bottom it communicates with said flue, a plurality of horizontal heat exchange tubes closely distributed in said heating chamber for conducting a heating fluid to be heated in said heating chamber, and a slide arranged at the bottom of said heating chamber and operable to close substantially the entire bottom area thereof to control the passage between said heating chamber and said flue. Other features of the invention will be apparent from the following description.

The accompanying drawings show by way of example embodiments of the invention. Figures 1 and 2 show a front elevation of a kitchen range partly in section with a hot-water preparing plant, and a section along the lines 2—2 of Fig. 1, respectively. Fig. 3 is a sectional view of a range as shown in Fig. 1, taken along lines 3—3, to indicate the shape of the slide situated below the plant for preparing warm water or steam, and the grate. Fig. 4 is a sectional view of a range as shown in Fig. 1, taken along the line 4—4 of Fig. 1. Figs. 5 and 6 show another embodiment of the heat exchange unit in front and end elevation, respectively.

In Figs. 1 and 2, 1 designates an upper oven and 2 a lower oven, both arranged in the heating space 5 beside the fire box 28 and ashpit 30, respectively, which are shown in Figs. 3 and 4. Separated by a partition 4, the heating space 6 for the steam generating plant adjoins the ovens. The partition 4 has an upper aperture 7 and a lower aperture 8. The lower aperture 8 is controlled by a slide 24 provided with oblong slots and slidable on a plate 25 having corresponding slots. The steam generating plant consists of a number of heating coils.

Below said plant the horizontal slide 20 is movably arranged on a plate 21. 37 designates the outlet for the combustion gases.

In the range shown in Figs. 1 and 2, 33 is the horizontal upper main manifold, from which vertical downward manifolds 12 branch off. 34 designates the horizontal lower main manifold, which has connected thereto vertical upward manifolds 13. Each manifold 12 is connected to the adjacent manifold 13 by oblique return bends 38. These return bend tubes 38 are regularly spaced throughout the heating chamber and of smaller internal diameter than the manifolds 12 and 13.

Fig. 3 shows the horizontal slide 20, which extends almost throughout the cross section of the heating space 6 and has evenly distributed slots 39 corresponding to the slots in the plate 21 below. In one end position of the slide 21 the entire area of the slots is available for the passage of the combustion gases whereas in the other end position the space 6 is shut off. By moving the slide 20 the slots therein can be brought into and out of register with the slots in plate 21 so that the draft of the range can be controlled and evenly distributed throughout the area of the heating chamber 6.

The grate 26 (Figs. 3 and 4) may be shut off completely from the ashpit 30 by two slidable cover plates 27 having eyes for actuation with a fire hook. Bypassing the grate 26, a duct 29 extends from the ashpit 30 directly to the combustion space 28. The duct 29 is closed by a movable slide 31, which is provided with slots like the appertaining plate 40. The opening for the supply of fuel is provided with an outer feed door 41 and an inner feed door 43 provided with slots. 44 designates the ash door. The feed door 41 and the ash door 44 are provided with asbestos gaskets 46 and 47, respectively. Figs. 5 and 6 show a special embodiment of the return bends 32 of the heating tubes; the connections to the manifolds are bent in such a manner that the return bends associated with a pair of manifolds 12, 13 lie in a vertical plane.

Thus it is seen that the inner feed door 43 and the plate 40, respectively, are parts of the front and rear walls defining the combustion chamber 28 and are formed with over-fire air inlets. On the other hand the outer feed door 41 and the slide 31, respectively, are means in controlling relation with and operable to open and close said inlets. For good heating of the fluid conducted in tubes 38 the maximum opening of said inlets must be such as to cause a formation of flames sufficient to sweep over all heat exchange tubes 38.

When the range shown in Fig. 1 is being installed, the optimum draft in the heating space 5 for the ovens is obtained by closing the slide 20, adjusting the slide 24, and marking the optimum slide setting on a scale. Thereafter the slide 24 is closed and the optimum position of the slide 20 is marked on a scale. The combustion gases flowing through the slide to the flue 37 are observed through an aperture which is provided in a side wall of the range and covered with a glass plate. When the combustion gases pass in an even distribution throughout the width of the slide the optimum position of the slide is ascertained and also marked on a scale. Finally the slide 31 shutting off the duct 29 is adjusted so that the secondary air flowing from the ashpit 30 through the duct into the upper part of the heating space 28 effects the combustion of the major portion of the still combustible components of the combustion gases which flow from the grate 26 through the duct 48 to the water heating plant. In conjunction with the optimum setting of the slide 20, it is thus achieved that the flames from the combustion space 28 sweep evenly over the heating tubes of the water heating plant down to the closing slide 20. Thus they are utilized to a maximum degree for heating the water in the return bends 38.

For normal baking with a kitchen range as shown in Figs. 1 and 2 the slide 20 is closed and the slide 24 is brought into its marked optimum position. Then the combustion gases will flow from the combustion space 28 through the duct 48 into the heating space 5, over the ovens 1 and 2, and further through the slide 24 to the outlet 37.

To operate the steam generating plant the slide 24 is closed and the slide 20 is brought into its optimum position. During heating-up the outer feed door 41 is opened, the inner feed door 43 is closed, and the flame gases pass from the combustion space 28 through the duct 48 and the upper aperture 7 of the partition 4 into the heating space 6, where they sweep the heating tubes and heat the water therein. From there the combustion gases flow through the slide 20 to the outlet 37. Then a circulation begins, the steam accumulated from the heating tubes in the manifold flowing through the connection to the radiators of a steam heating plant, and from the same through the connection back into the lower manifold.

After heating-up the range has been completed, the plates 27 are moved into the intermediate position in which they cover the grate 26 completely and thereafter the doors 41 and 44 are closed. Moreover, all slides are closed. This complete closing of the combustion space 28 and the spaces 5, 6 ensures that the heat will be retained in the combustion space 28 through eight to twelve hours and the water circulation in the heating plant will be maintained.

In installing a kitchen range as shown in Figs. 1 and 2, the slide 20 and the slide 24, which controls the lower aperture 8 in the partition 4, are brought into their respective optimum positions and fixed. The change-over of the range from baking to the operation of a water heating plant is effected by a flap 23, which alternately covers the upper aperture 7 of the wall 4 or the aperture 22 between the oven 1 and the partition 4, and which is operated from the outside.

On the other hand, the water heating plant is most suitable for preparing warm or hot water owing to the interposition of additional manifolds between the main manifolds and the heating tubes. To avoid the formation of steam by an excessive heating of the water in the heating tubes, the same consist of simple return bends which are connected in parallel to each other to the additional manifolds, which lead to the main manifolds. The partitions 14 and 15 provide two completely separate water cycles for two central heating plants, which may be in different stories, or for a central heating plant and a hot-water reservoir.

E. g., the water heated in the parallel-connected return bends 38 will flow into the additional manifolds 12 and from there through the left-hand section of the main manifold 33 and the connection 16 to the heating plant. The water cooled there flows through the connection 17, the left-hand section of the main manifold 34, and the manifold 13 back to the return bends.

In an embodiment of the kitchen range which is not shown in the drawings the slide at the lower aperture 8 of the partition 4 is eliminated. The slide 20 in the heating space 6 is set permanently when the range is installed. By means of a flap 23, as in Fig. 1. The combustion gases can then be bypassed either from the heating space 5 or to the heating space 6.

The oblique arrangement of the return bends provides for an even distribution of the heating tubes all over the cross section of the space 6 and is suitable in particular where the draft available is relatively strong.

Where this is not the case the return bends are suitably arranged as shown in Figs. 5 and 6, where the return bends leading to the same manifolds lie in a vertical plane. Thereby the obstacles for the combustion gases are reduced and where the draft is weak the maximum utilization of their energy is ensured.

The lateral arrangement of the combustion space, oven and water heating plant has the advantage of better supervision and easy repair and cleaning when necessary. Moreover, an adaptation to the operational requirements at any time is provided by the possibility of connecting during installation or later the water heating or steam generating plant to different heating-medium cycles and to incorporate a hot-water reservoir instead of part of the heating tubes.

What I claim is:

1. A kitchen range comprising top-, bottom-, front-, back- and side-walls, means within the range forming a combustion chamber, an ashpit below said combustion chamber, an outlet flue, a water heating chamber disposed laterally of said combustion chamber and an oven disposed between said combustion chamber and said water heating chamber, a duct overlying said oven connecting directly said combustion chamber with the top of said water heating chamber and a first damper means in said duct for closing said duct into said water heating chamber, means communicating the bottom of the latter with said flue, and a slide having slots arranged at and extending substantially throughout the entire bottom area of said water heating chamber and a plate, having slots similar to that of said slide, immovably secured across substantially the entire bottom area of said water heating chamber, said slide being movable relative said plate in order to bring said slots in and out of register with each other, said slide being adapted to control the passage between said water heating chamber and said outlet flue, means forming a passage adjacent said water heating chamber and said oven and second damper means between said passage and said outlet flue, said last named passage communicating with said overlying duct, and a fuel feed door disposed in said front wall in front of said combustion chamber and having air admission means, an intermediate wall disposed parallel to said back wall and forming with the latter a duct communicating said ashpit with said combustion chamber, a third damper means arranged at and extending along said intermediate wall, said air admission means being adapted to control the flow of over-fire air into said combustion chamber, and said water heating chamber having therein a plurality of horizontally disposed heat exchange tubes equally and closely distributed in said water heating chamber.

2. The kitchen range, as set forth in claim 1, in which said heat exchange tubes comprise a horizontal, upper main manifold and a horizontal lower main manifold, a plurality of first vertical additional manifolds extending downwardly from said upper main manifold and a plurality of second vertical additional manifolds extending upwardly from said lower main manifold, each of said first vertical additional manifolds being disposed between a pair of adjacent second vertical additional manifolds, and a plurality of obliquely arranged return bends connecting each of said first vertical manifolds with its adjacent second vertical manifold, the cross section of said return bends being smaller than that of said manifolds.

(References on following page)

References Cited in the file of this patent

UNITED STATES PATENTS

| | | |
|---|---|---|
| 519,750 | Wilcox | May 15, 1894 |
| 681,245 | Muir | Aug. 27, 1901 |
| 693,761 | Walters | Feb. 18, 1902 |
| 1,014,760 | Kreunen | Jan. 16, 1912 |
| 1,496,267 | Helton | June 3, 1924 |
| 2,372,086 | Kahn | Mar. 20, 1945 |

FOREIGN PATENTS

| | | |
|---|---|---|
| 628,873 | France | July 11, 1927 |
| 737,013 | France | Sept. 26, 1932 |
| 840,449 | France | July 8, 1939 |